United States Patent
Brundick et al.

(10) Patent No.: US 9,075,143 B2
(45) Date of Patent: Jul. 7, 2015

(54) SPARSE ARRAY RF IMAGING FOR SURVEILLANCE APPLICATIONS

(75) Inventors: Christopher S. Brundick, Aldie, VA (US); Dwight E. Davis, Arlington, VA (US); David E. Norris, Fairfax Station, VA (US); Ernest S. Stickels, Lothian, MD (US)

(73) Assignee: Applied Physical Sciences Corp., Groton, CT (US)

( * ) Notice: Subject to any disclaimer, the term of this patent is extended or adjusted under 35 U.S.C. 154(b) by 773 days.

(21) Appl. No.: 13/097,812

(22) Filed: Apr. 29, 2011

(65) Prior Publication Data

US 2011/0267221 A1   Nov. 3, 2011

Related U.S. Application Data

(60) Provisional application No. 61/329,655, filed on Apr. 30, 2010.

(51) Int. Cl.
| | |
|---|---|
| *G01S 13/66* | (2006.01) |
| *G01S 13/89* | (2006.01) |
| *G01S 13/87* | (2006.01) |
| *G01S 7/20* | (2006.01) |
| *G01S 13/72* | (2006.01) |

(52) U.S. Cl.
CPC ............... *G01S 13/878* (2013.01); *G01S 13/66* (2013.01); *G01S 13/89* (2013.01); *G01S 7/20* (2013.01); *G01S 13/723* (2013.01)

(58) Field of Classification Search
CPC ....... G01S 13/878; G01S 13/89; G01S 13/66; G01S 7/20; G01S 13/72; G01S 13/723
USPC .......................................................... 342/180
See application file for complete search history.

(56) References Cited

U.S. PATENT DOCUMENTS

| | | | |
|---|---|---|---|
| 6,573,855 B1* | 6/2003 | Hayakawa et al. | 342/22 |
| 6,777,684 B1* | 8/2004 | Volkov et al. | 250/341.1 |
| 7,280,068 B2* | 10/2007 | Lee et al. | 342/22 |
| 7,345,621 B2* | 3/2008 | Bourdelais et al. | 342/90 |
| 8,094,063 B1* | 1/2012 | Cammerata | 342/179 |
| 8,330,647 B2* | 12/2012 | Fox et al. | 342/91 |
| 2009/0052737 A1* | 2/2009 | Lycett | 382/103 |

* cited by examiner

*Primary Examiner* — Matthew M Barker
(74) *Attorney, Agent, or Firm* — Ryan, Mason & Lewis, LLP (57) ABSTRACT

Techniques are provided for sparse array RF imaging for surveillance applications. The present invention enables object image identification using a sparsely populated array of distributed radio nodes deployed and operated as a radar detection, tracking and identification application. Three-dimensional object images are formed, from which estimates of extent and shape can be extracted for objects that are detected in the vicinity of the deployed radar array. In addition, techniques are provided for the identification and/or classification of vehicles, humans and fauna through feature extraction from the formed three-dimensional images.

16 Claims, 6 Drawing Sheets

$X$ = image feature

Threshold both upper and lower bound $X_{min}$ = minimum threshold $X_{max}$ = maximum threshold $X(X > X_{max}) = X_{max}$ $X(X < X_{min}) = X_{min}$ Condition to range [-1:1]

$X_{thresh}$ = classification threshold $\overline{\overline{X}}$ = conditioned image feature $X$ $\overline{\overline{X}}(\overline{\overline{X}} > X_{thresh}) = (X - X_{thresh})/(X_{max} - X_{thresh})$ $\overline{\overline{X}}(\overline{\overline{X}} > X_{thresh}) = (X - X_{thresh})/(X_{thresh} - X_{min})$

FIG. 7

$W_H$ = weighting parameter for height of image center of mass $W_{AR}$ = weighting parameter for image horizontal aspect ratio $W_\theta$ = weighting parameter for image alignment with target heading $W_O$ = weighting parameter for image orientation (wide = 1/deep = -1)

$W_H + W_{AR} + W_\theta + W_O = 1$   sum of all weights equals 1 by definition $CS$ = classification score $CS = W_H * \overline{\overline{H}} + W_{AR} * \overline{\overline{AR}} + W_\theta * \overline{\overline{\theta}} + W_O * \overline{\overline{O}}$

SPARSE ARRAY RF IMAGING FOR SURVEILLANCE APPLICATIONS

CROSS REFERENCE TO RELATED APPLICATIONS

This application claims priority to U.S. Provisional Application No. 61/329,655, filed Apr. 30, 2010, incorporated by reference herein.

FIELD OF THE INVENTION

The present invention relates generally to surveillance systems, and more particularly, to methods and apparatus for forming three dimensional (3-D) images of objects using a sparsely deployed array of antennae to collect multi-static radio frequency detection data and for classifying such objects.

BACKGROUND OF THE INVENTION

Perimeter protection systems are designed to detect events where intruders approach and/or enter a secure region, using a sensor enabled physical boundary, and to alert security personnel. The traditional security barrier uses a chain-link fence with motion detectors that are tuned to detect the presence of an intruder within a few feet of the fence, along with a security camera that can be directed by the security staff to view the cause of any motion alert. Alternatives to this configuration include the use of infrared beam-break sensors in locations where a physical barrier is not practical, and the use of centralized ground radar systems that scan the perimeter for possible threats. All of the traditional perimeter systems require that security personnel must identify the source of alarms, either using imaging devices or by responding to the reported site in person and investigating the cause. For many large facilities, the local fauna provide a significant source of nuisance alarms that force the facility to expend significant resources to ensure adequate protection.

While infrared cameras provide a reasonable capability to enable security personnel to distinguish local fauna from human intruders, the effects of weather and foliage can severely degrade the captured image utility. Additionally, the costs associated with infrared imaging cameras often prohibit the use of the number of cameras that are needed to form images across the entire perimeter. A need therefore exists for a low cost alternative to infrared imaging for intruder classification that can work in substantially all weather conditions and in the presence of foliage.

SUMMARY OF THE INVENTION

Generally, techniques are provided for sparse array RF imaging for surveillance applications. According to one aspect of the invention, three dimensional (3-D) images are formed of one or more objects using a sparsely deployed array of antennae to collect multi-static radio frequency detection data. One or more candidate detections are selected from the detection data for generation of one or more target tracks and for target classification. Thereafter, the candidate detections are localized and clustered to form a set of candidate target clusters in an observation plane. One or more candidate target clusters are associated with existing target tracks and/or new frame-to-frame moving object tracks within a field of view. A substantially optimal subset of image target track points are selected along a given track for imaging. The detection data for a selected image track point is conditioned using one or more conditioning filters to generate an image-data-set. Finally, a target imaging locus is identified for each selected image track point and the 3-D image is constructed using the image-data.

According to another aspect of the invention, objects in a three dimensional (3-D) image-data-set obtained from multi-static radio frequency detection data are classified, for example, as human or non-human. One or more geometric image features are extracted from the image-data-set that support a target classification process; and the one or more objects are classified as a threat based on a parametric evaluation of the extracted geometric image features.

For example, the extracted geometric image features may comprise a height of an image center of mass above ground, an image occupation extent, vertical and horizontal aspect ratios, image alignment with target direction and/or orientation of the image with respect to a track heading vector. The extracted geometric image features may also comprise image surface area, discernable image appendages and position and/or target shape evolution through a sequence of images generated sequentially over a subset of a target track.

A more complete understanding of the present invention, as well as further features and advantages of the present invention, will be obtained by reference to the following detailed description and drawings.

DETAILED DESCRIPTION

The present invention enables object image identification using a sparsely populated array of distributed radio nodes deployed and operated as a radar detection, tracking and identification application. The present invention recognizes that the employed radar sensors operate in the microwave RF spectrum, and thus are not masked by rain or fog. In addition, the employed radar sensors have sufficient range resolution to detect moving objects within dense foliage. Using a sparse array of radars mounted, for example, in fence posts enables the detection and tracking of intruders approaching the perimeter along with an automated recognition of nuisance alerts through formation and classification of an RF 3D image formed at selected points of the intruder's track.

One aspect of the invention includes the ability to form 3-D object images, from which estimates of extent and shape can be extracted for objects that are detected in the vicinity of the deployed radar array. Additionally, another aspect of the invention automates the identification of vehicles, humans and fauna through feature extraction from the formed 3-D images. An exemplary implementation of the invention has been demonstrated using microwave impulse radios deployed on horizontally distributed 2 to 3 meter poles, each pole comprising a vertical array of multiple radios, operating in the presence of typical perimeter security clutter sources (buildings, trees, ground vegetation and electrical wiring).

One aspect of the invention covers the radar detection processing, multi-target tracking and association, image formation and image processing necessary to form classification quality images from a sparse array of distributed radar sensors. Each step in the process ensures that the final 3-D image products and subsequent object classification logic can meet operational metrics for rejecting false alerts caused by indigenous wildlife and to accurately assess those objects that pose a perimeter security threat. The nature of the radar signals used in the detection process is only limited by the need to operate at a frequency where human targets present reasonable radar cross-sections at multiple phase centers (generally the microwave region of the spectrum is ideal from 1 to 10 GHz) and with a range resolution that is at least small enough to resolve the extent of a human target (resolutions of 12" to 24" are deemed adequate, corresponding to a temporal extent of 2-4 nanoseconds after peak detection).

Figure 1:
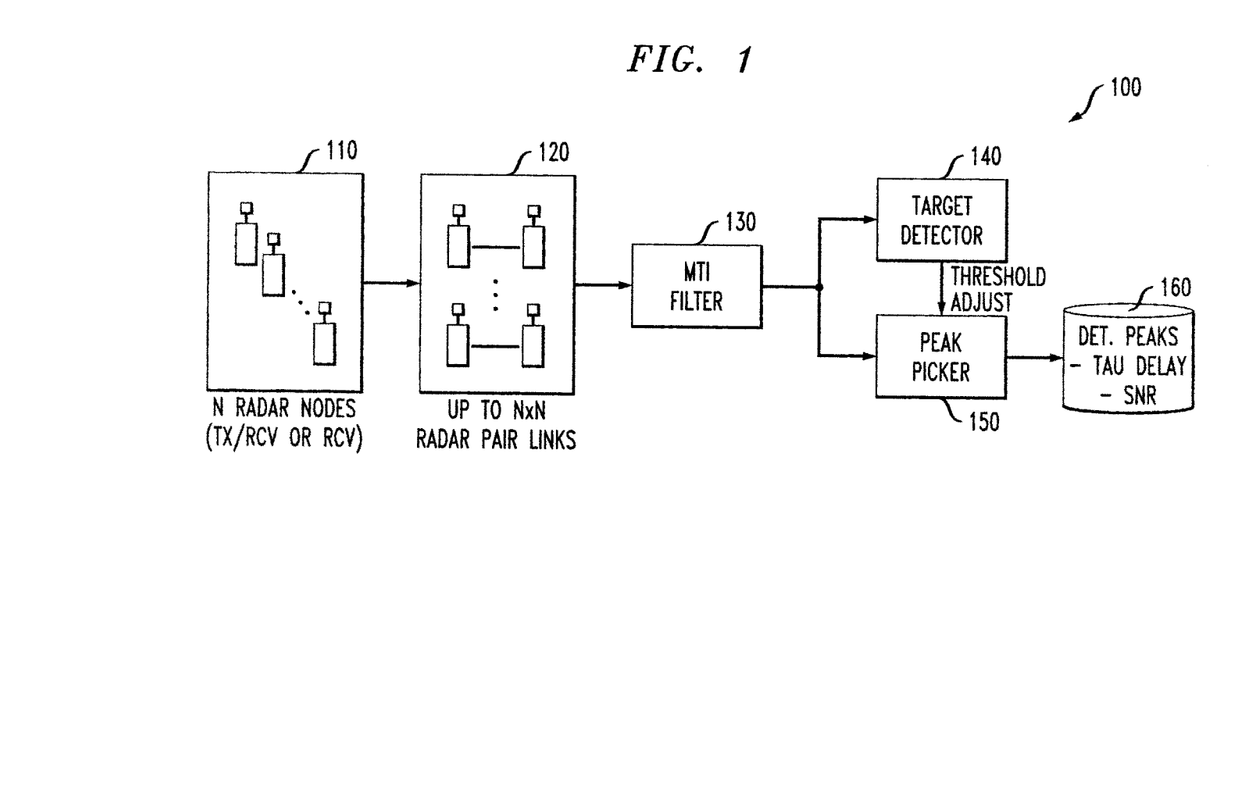
FIG. 1 illustrates a sparse array radio configuration and the sensing and detection portions of the overall process.

FIG. 1 is a flow diagram illustrating an exemplary implementation of sensing and detection portions 100 of a sparse array RF imaging system incorporating features of the present invention.

As shown in FIG. 1, the system 100 comprises an array 110 of Ultra-Wide Bandwidth (UWB) radios, where each of the N radios operate alternately as a transmitter and as a monostatic and bistatic receiver. The time division multiplexed (interleaved) operation of the radios 110 forms a frame 120 of radar return data for each radar pair organized in a matrix, with the diagonal representing the monostatic radar operation.

In order to detect pedestrians, large ruminants and small all-terrain vehicles that approach the radar array, a moving target indicator (MTI) detector 130 is employed that suppresses stationary reflections from the ground and quasi-static objects in the neighborhood of the radar sensors. The Time Division Multiple Access (TDMA) cycle (radar pair scan rate) updates with a periodicity that is sufficient to observe targets moving in time delay through the MTI filter 130 that rejects energy persisting in a given time delay cell (general TDMA cycles 0.2 to 0.4 s long).

The MTI-filtered signals for each radar link (monostatic or bistatic) are squared and integrated to match the signal range resolution by a target detector 140 before peak detection is applied by a peak picker 150. The residual MTI-filtered energy is then normalized over scans and time-delay cells to estimate the signal-to-background ratio. The cells that exceed the detector threshold in signal-to-background ratio are then picked by the peak picker 150 to identify candidate moving target time-delay cells that are stored in a measurement database 160.

Figure 2:
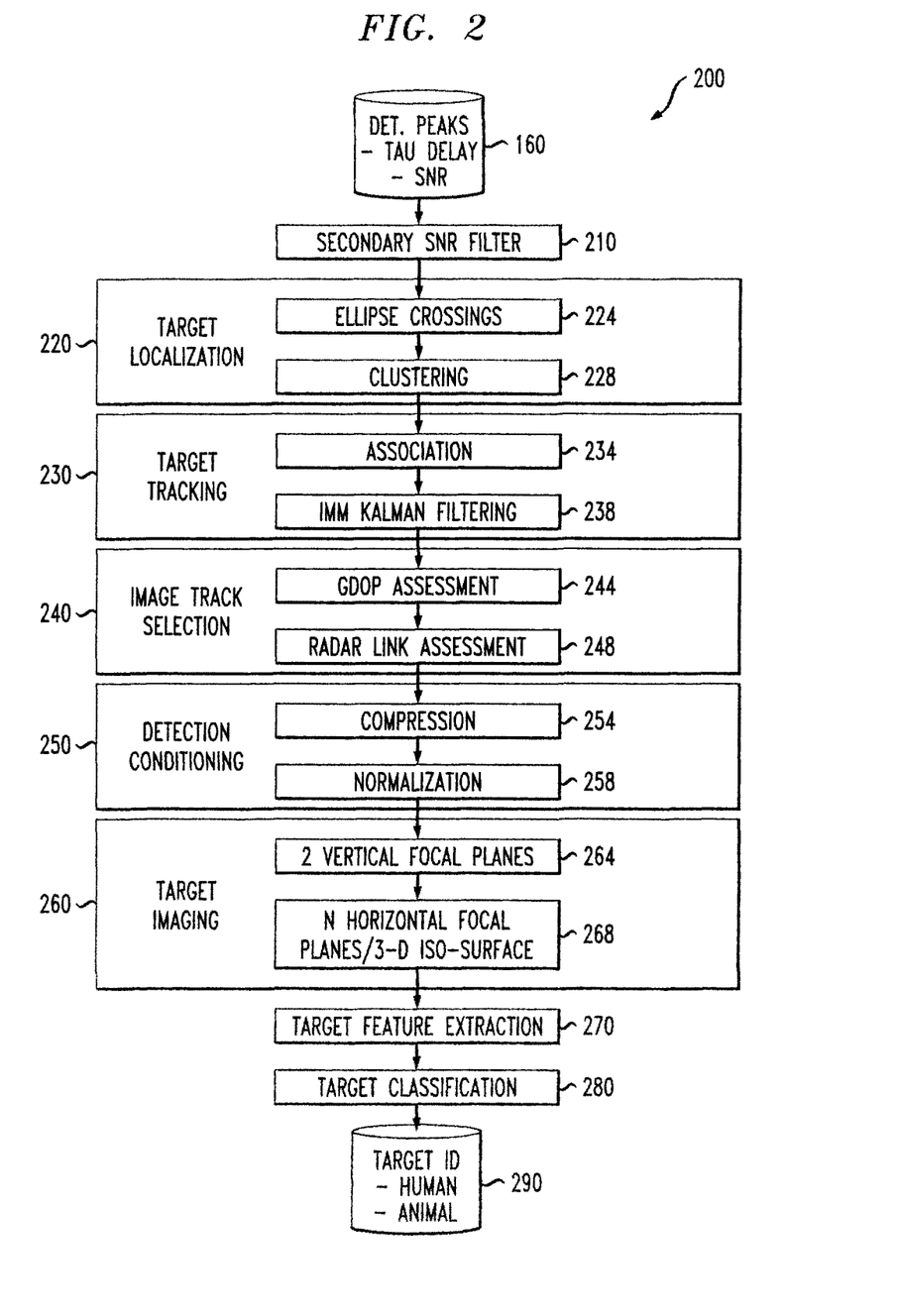
FIG. 2 is an overall flow diagram from detection to target identification.

FIG. 2 is a flow diagram illustrating an exemplary implementation of detection and target identification portions 200 of a sparse array RF imaging system incorporating features of the present invention. As shown in FIG. 2, and as discussed further below in conjunction with FIG. 3 (steps 310-370), the detected return peaks stored in the measurement database 160 are then sorted by signal-to-noise ratio (SNR) and a secondary selection is applied by a secondary SNR filter 210 to reduce the number of returns considered for subsequent processing.

As shown in FIG. 2, and as discussed further below in conjunction with FIG. 3 (steps 380-395), a target localization process 220 then computes ellipse-ellipse crossings (from bistatic detections), ellipse-circle crossings (from bistatic and monostatic detections), and circle-circle crossings (from monostatic detections) (step 224) and clusters detected peaks at step 228 in time-delay over regions that are consistent with the largest extent targets of interest.

As shown in FIG. 2, and as discussed further below in conjunction with FIG. 4, a target track estimation process 230 then detects a position association at stage 234 and performs a multiple independent motion model tracking process 238, for example, utilizing a Kalman filter. An image track selection process 240, discussed further below in conjunction with FIG. 5, then assesses the geometric dilution of precision (GDOP) and radar link resolution attainable at each track point at stages 244, 248, respectively.

A detection condition process 250, discussed further below in conjunction with FIG. 5, then performs a dynamic range compression at stage 254 that suppresses high energy glints from dominating the image, while ensuring the weak energy glints contribute to the image volume, and a non-linear compression filter is applied to the detection samples at stage 258, where the data is normalized to fit a unit variance distribution.

A target imaging process 260, discussed further below in conjunction with FIG. 5, then focuses the 3-D image in two orthogonal vertical planes at stage 264 and in multiple horizontal planes at stage 268. As discussed further below, target feature extraction is performed at stage 270 and target classification is performed at stage 280. The classification result for each object is stored in a target identifier database 290.

Figure 3:
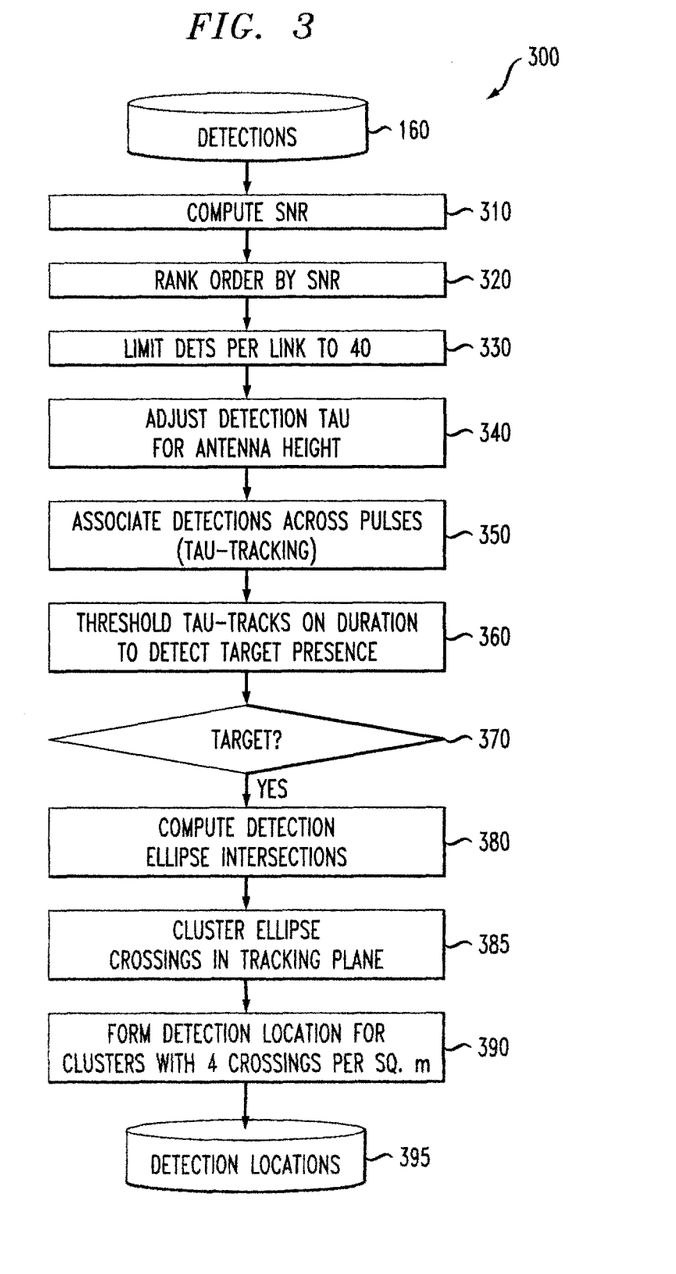
FIG. 3 illustrates the target localization process in further detail.

FIG. 3 illustrates the target localization process 300 corresponding to steps 210 and 220 of FIG. 2 in further detail. As shown in FIG. 3, the target localization process 300 initially obtains the detected return peaks from the measurement database 160. The SNR of each obtained detected return peak is computed at stage 310 and then the peaks are sorted by SNR at stage 320. In the exemplary embodiment, only the top 40 peaks for each link are selected at stage 330 to reduce the number of returns considered for subsequent processing.

The detected peaks are then adjusted at stage 340 to account for the antenna height, and the detection clusters are then sequentially associated across pulses at stage 350 using a constant range-rate motion model and a sequence time-delay tracker. If a sequence of detections is identified as a high confidence moving target track (relative to a threshold applied and tested at stages 360, 370), then an event detection is declared for that link, enabling the execution of the multi-sensor target localization and tracking algorithm to begin searching for potential intruders.

Once an event is detected on one of the radio links (stage 370), the target localization process 300 is employed using all of the detection clusters from all of the radio links that form within the neighborhood of the detecting fence post (radar array element). The first step 380 for target localization is the estimation of all of the possible target positions as defined by the intersections of the time-delay-of-arrival (TDOA) ellipses (for bistatic links) and circles (for monostatic links) at a given detection time interval. These TDOA crossing points are clustered at step 385 to identify regions of high density which represent likely target locations.

The target localization process 300 generates possible target locations starting with the highest density crossing region at step 390, then removes the associated ellipses and circles from the solution and performs clustering on the residual crossing points. Once this process exhausts the available detections for a given time interval, the identified potential target regions are stored in a detection locations database 395 for passage to the multi-target probability density function association filter (PDAF) tracking algorithm 400 (FIG. 4).

Figure 4:
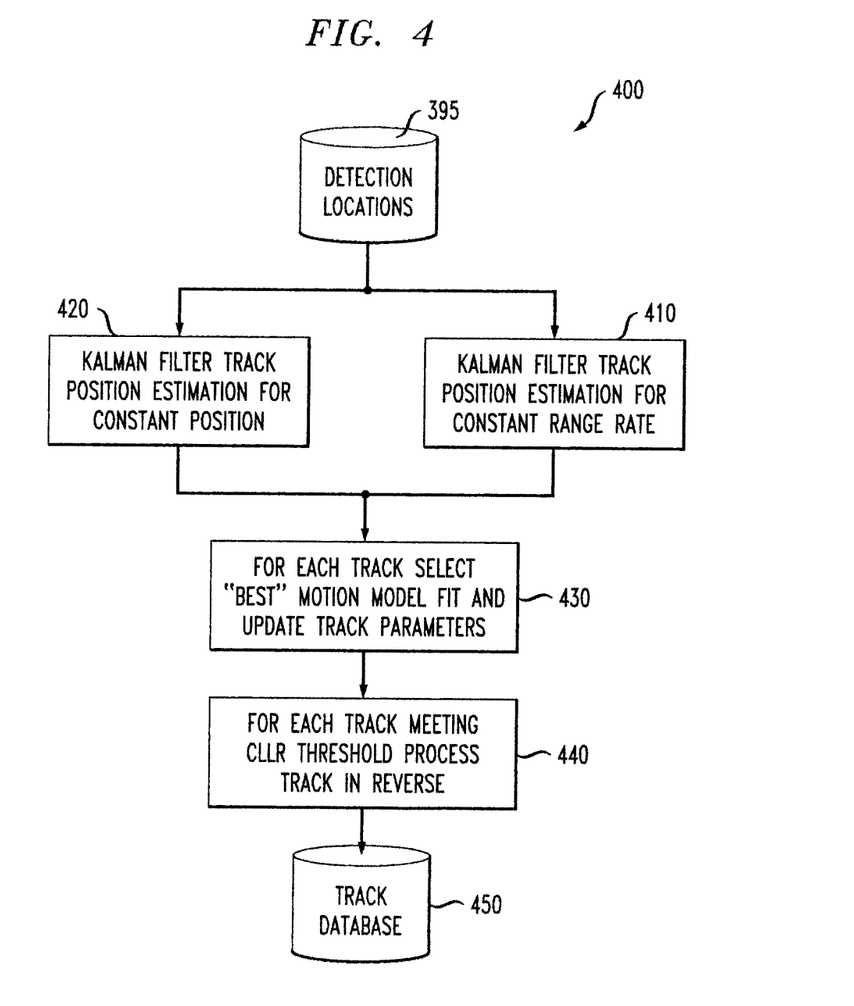
FIG. 4 illustrates the track estimation process in further detail.

FIG. 4 is a flow chart describing an exemplary implementation of the track estimation process 400. As shown in FIG. 4, the exemplary PDAF tracking process 400 obtains the identified potential target regions from the detection locations database 395 and uses a Kalman filter estimator with multiple independent motion models (IMMs) (constant course and speed in block 410 and constant position in block 420) to compute the log-likelihood ratio (LLR) for detection position association. The "best" motion model is selected for each track at block 430, and the track parameters are updated.

A sequence of detection-position-clusters forms an association track with cumulative LLR (CLLR) defining the track confidence level. When the level of the CLLR exceeds the confidence threshold, as determined at block 440, then the target track is reported, along with the target position history, in a track database 450. The residual unassociated detection positions are then used to attempt to form new target tracks that meet a minimum PDAF threshold in LLR from the Kalman filter. The formed tracks are updated with each detection interval until either the target is no longer detected within the radar array, or the track confidence level (CLLR) falls below a track retention threshold. Each target position associated with the track retains a mapping to the underlying radar signals that make up the cluster intersection points. These data form the detections database 525 as discussed further below in conjunction with FIG. 5. These data are used later in the processing chain for image formation and target identification, as discussed hereinafter.

Figure 5:
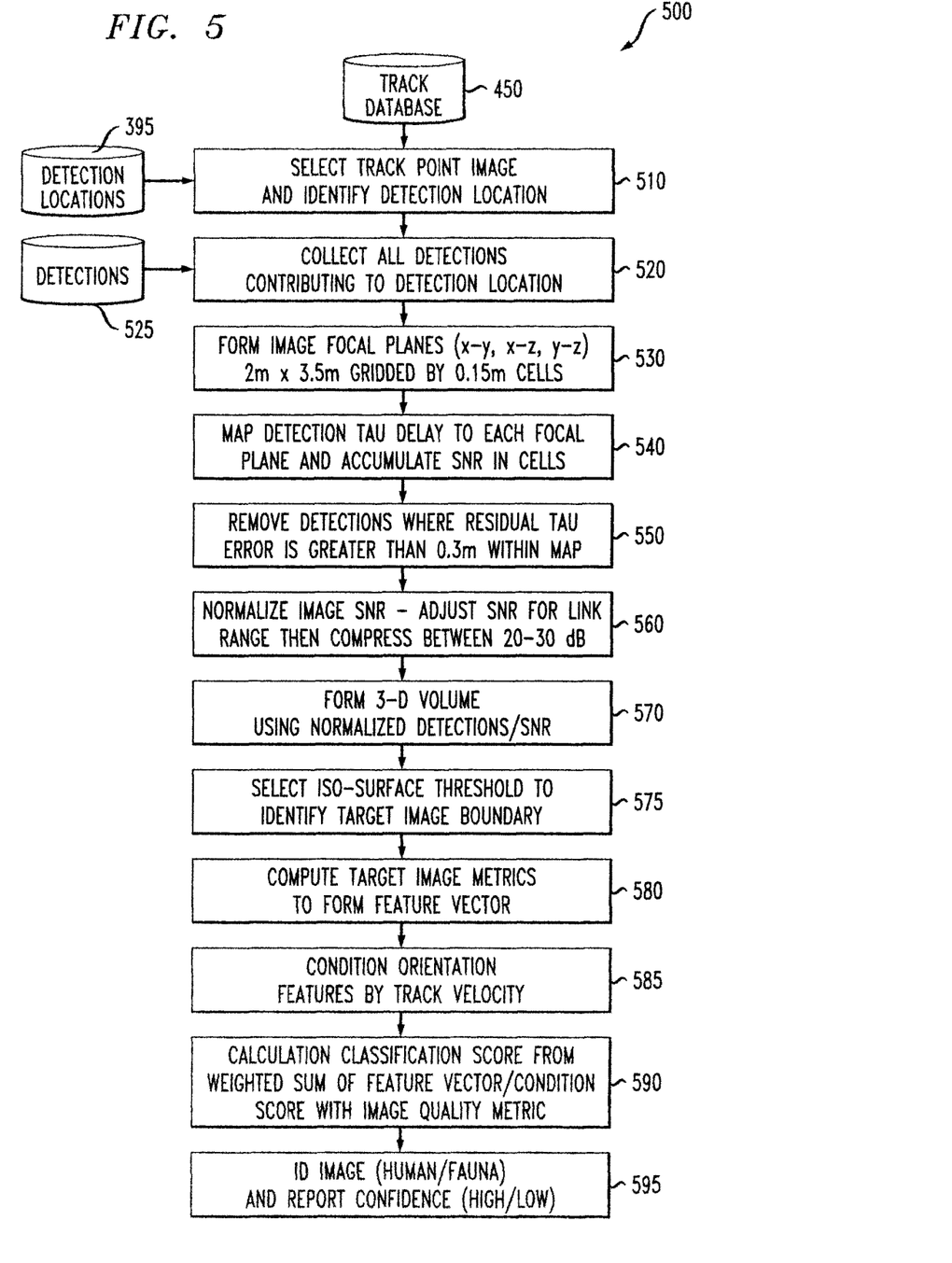
FIG. 5 illustrates the target track estimation process in further detail.

FIG. 5 is a flow chart describing an exemplary implementation of a target track estimation process 500 incorporating features of the present invention.

While all of the track points contain image formation energy, not all positions are equally favorable in contributing to image quality. The geometry of the sparse array with respect to the geographic position of the target dictates the achievable image resolution due to the effect of geometric dilution of precision (GDOP) based on the available object detections. A model which provides an optimal evaluation of the GDOP, as well as SNR, quantity of detections, diversity of detections, and terrain, is used to assess the attainable resolution at each track point by estimating the achievable precision given the population of radar detections (which poles and which radios on each pole contributed to the track point). If the precision attainable from geometric considerations meets the predefined image formation quality metric, then the set of detections associated with the track point are handed to the image formation algorithm. The process includes the reporting of a track point selection score which quantifies prediction quality of the point for use in image formation.

The set of time-delay detections (energy above the signal-to-background ratio threshold) forms the image generation input data that will be mapped to the 3-D region centered on the track position. In order to obtain images that capture the occupation space of the target in the neighborhood of the track position, it is necessary to perform detection conditioning that manages the image contrast and dynamic range.

As shown in FIG. 5, the track estimation process 500 initially selects a track point image at step 510, from the detection locations database 395 and identifies the detection location for the track point image. Thereafter, the track estimation process 500 collects all detections during step 520 from a detections database 525 that contribute to detection location.

The image focal planes are formed across three planes (x-y, x-z and y-z) during step 530. The time-delay detections are mapped to each focal plane during step 540 and the SNR is accumulated in the volume cells. Detections are removed during step 550 where the residual error exceeds a predefined threshold.

The primary conditioning filter is a dynamic range compression during step 560 that suppresses high energy glints from dominating the image, while ensuring the weak energy glints contribute to the image volume. Once the non-linear compression filter is applied to the detection samples, the data is normalized to fit a unit variance distribution. Each of these normalized detection values is then mapped to the imaging volume in the volume cells that match the TDOA associated with the detection on the given radar link, and is summed to form the 3-D image during step 570. Once each sample is mapped and summed into the 3-D image volume, the resulting image volume cell intensity distribution is analyzed to determine the image boundary threshold (transition from target boundary to residual background energy). The surface that represents the transition within the volume at the boundary threshold is then computed to form the 3-D image that represents target occupation during steps 575, 580 and 585. A set of 3-D images may be formed over multiple track points to form a time-lapse evolution of the target as it moves through its track. These 3-D surfaces are processed using image feature extraction and feature-based object identification during step 590 and 595.

Figure 6:
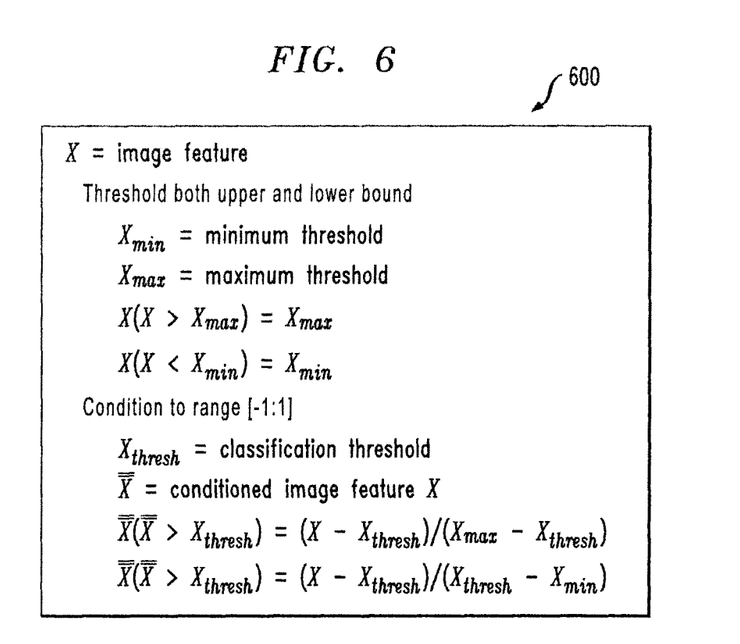
FIG. 6 illustrates the thresholding and conditioning scheme for a generic image feature.
Figure 7:
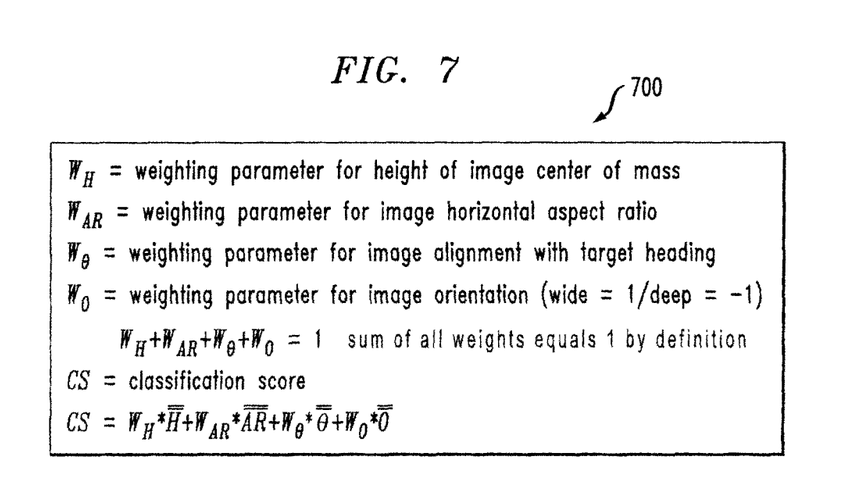
FIG. 7 illustrates the process of computing a classification score from conditioned features and weighting parameters.

The 3-D surface images that are formed from the radio link detections are processed to automatically decide if a target is likely a threat or merely the result of indigenous wildlife. The object classification algorithm first utilizes a set of feature extraction algorithms during steps 580 and 585 that estimate physical characteristics that may be observed within the 3-D image. In one exemplary implementation, the specific features utilized are:

Height of the image center of mass above ground
Image occupation extent (horizontal and vertical)
Vertical and Horizontal aspect ratio
Image alignment with target direction, as defined from the horizontal aspect ratio's orientation with respect to the track heading vector
Orientation (wide/deep) of image with respect to the track heading vector In addition to the feature listed above, further clues as to the target's nature can be extracted from:

Image surface area
Discernable image appendages and their position(s)
Target shape evolution through a sequence of images generated sequentially over a subset of the target track FIG. 6 illustrates an exemplary thresholding and conditioning scheme 600 for generic image feature X, where $X_{max}$, $X_{min}$ and $X_{thresh}$ are parameters. Each image feature utilized is first limited to both an upper and a lower bound during step 580. It is then conditioned by a classification threshold to fall within a range of −1 to 1. Negative values indicate animal target and positive values indicate human targets, as shown in FIG. 6. FIG. 7 illustrates an exemplary computation of a classification score, CS, from conditioned features and weighting parameters.

The conditioned image features are next combined during step 590 using a weighting scheme to generate a classification score, where the weighting scheme is based on the analysis of a large volume of field measurements of both human and animal targets, as shown in FIG. 7. One dominant target feature that is leveraged in the exemplary embodiment is the horizontal aspect ratio. Humans are generally wider in extent while animals are more elongated. A second key target characteristic is height. The center of mass of humans is generally higher than that of the indigenous wildlife likely to be present.

A positive classification score indicates a human while a negative score indicates indigenous fauna. The greater the score deviation from zero, the higher the classification confidence. As a result, either a high or low confidence marker can be included in the classification report.

In addition to the feature weighting scheme, there are two novel aspects of the approach that increase its robustness. First, the image alignment metric is conditioned with track velocity (taken from the track estimation process discussed above) (step 585). The image alignment is ambiguous when the target is stationary, and its estimation uncertainty decreases as the target's speed increases. The conditioning scheme accounts for these properties and ensures the orientation feature contributes optimally to the classification score.

The second novel aspect in the approach is that the overall classification score for a given image is conditioned by an image quality metric (step 590). The image quality metric is based upon quantifying the coherence of the image within the 3-D computational volume. Contours are computed at set heights over all enclosed surfaces within the volume. Features of the contours are used to compute an image quality score. The exemplary features utilized are:

Number of enclosed surfaces, each with it's own contour set, within the computation volume
   Standard deviation of contour areas
   Standard deviation of the contour center of masses This image quality metric, as well as the set of image features, is computed for images generated at 8 selected target locations 595. The two images that are the statistical outliers with respect to the computed features are thrown out. Classification scores from the remaining 6 images are combined using a weighting scheme to generate an overall classification score for a given track. The weighting scheme is based on the combination of the image quality metric and track point selection score. Updates to the overall classification score are allowed if new track points are found that possess better track point selections scores than the 8 currently being used.

Exemplary System and Article of Manufacture Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

One or more embodiments can make use of software running on a general purpose computer or workstation. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). Suitable interconnections, can also be provided to a network interface, such as a network card, which can be provided to interface with a computer network, and to a media interface, such as a diskette or CD-ROM drive, which can be provided to interface with media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor coupled directly or indirectly to memory elements through a system bus. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards, displays, pointing devices, and the like) can be coupled to the system either directly (such as via bus) or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Method steps described herein may be tied, for example, to a general purpose computer programmed to carry out such steps, or to hardware for carrying out such steps, as described herein. Further, method steps described herein, including, for example, obtaining data streams and encoding the streams, may also be tied to physical sensors, such as cameras or microphones, from whence the data streams are obtained.

It should be noted that any of the methods described herein can include an additional step of providing a system comprising distinct software modules embodied on a computer readable storage medium. The method steps can then be carried out using the distinct software modules and/or sub-modules of the system, as described above, executing on one or more hardware processors. In some cases, specialized hardware may be employed to implement one or more of the functions described here. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A method for forming one or more three dimensional (3-D) images of one or more objects using a sparsely deployed array of antennae to collect multi-static radio frequency detection data, said method comprising the steps of:
   selecting one or more candidate detections from said detection data collected by said sparsely deployed array of antennae for generation of one or more target tracks and for target classification;
   localizing and clustering the candidate detections to form a set of candidate target clusters in an observation plane;
   associating one or more candidate target clusters with one or more of existing target tracks and new frame-to-frame moving object tracks within a field of view;
   selecting a subset of image target track points along a given track for imaging;
   conditioning the detection data for a selected image track point using one or more conditioning filters to generate an image-data-set; and
   identifying a target imaging locus for each selected image track point and constructing a 3-D image using the image-data, wherein each of said steps are performed by at least one processor.

2. The method of claim 1, wherein the step of selecting one or more candidate detections further comprises the step of removing from consideration one or more detections that do not contribute to target tracks.

3. The method of claim 1, wherein said step of selecting one or more candidate detections uses a filter based on a signal-to-noise ratio (SNR) to provide a reduced data set for imaging.

4. The method of claim 1, wherein said moving object tracks are qualified using one or more image track quality metrics.

5. The method of claim 4, wherein said one or more image track quality metrics are based upon a quantification of a coherence of the image within a 3-D computational volume.

6. The method of claim 5, wherein said quantification computes one or more contours at set heights over one or more enclosed surfaces within a computation volume.

7. The method of claim 6, further comprising the step of computing an image quality score based on one or more of a number of enclosed surfaces within the computation volume, a standard deviation of contour areas and a standard deviation of the contour center of masses.

8. The method of claim 1, wherein said associating step further comprises the step of executing a multiple independent motion model tracking process utilizing a Kalman filter.

9. The method of claim 8, wherein the Kalman filter selects a motion model that substantially best fits data available at each time step.

10. The method of claim 1, wherein said step of selecting an optimal subset of image target track points further comprises the step of selecting the image track points based on a geometric dilution of precision and radar link parameters.

11. The method of claim 1, wherein said one or more conditioning filters are tuned to filter one or more of high SNR detections and detections associated with nearby ground clutter.

12. The method of claim 1, wherein said conditioning step further comprises the step of compressing an SNR dynamic range to increase an effective number of image contributions.

13. The method of claim 1, wherein said conditioning step further comprises the step of applying a group normalization to control the contrast of the formed image.

14. The method of claim 1, wherein the 3-D image is focused in two orthogonal vertical planes and multiple horizontal planes.

15. A system for forming one or more three dimensional (3-D) images of one or more objects using a sparsely deployed array of antennae to collect multi-static radio frequency detection data, said system comprising:
   a memory; and
   at least one processor, coupled to the memory, configured to:
   select one or more candidate detections from said detection data collected by said sparsely deployed array of antennae for generation of one or more target tracks and for target classification;
   localize and clustering the candidate detections to form a set of candidate target clusters in an observation plane;
   associate one or more candidate target clusters with one or more of existing target tracks and new frame-to-frame moving object tracks within a field of view;
   select a subset of image target track points along a given track for imaging;
   condition the detection data for a selected image track point using one or more conditioning filters to generate an image-data-set; and
   identify a target imaging locus for each selected image track point and construct a 3-D image using the image-data.

16. An article of manufacture for forming one or more three dimensional (3-D) images of one or more objects using a sparsely deployed array of antennae to collect multi-static radio frequency detection data, comprising a non-transitory machine readable recordable medium containing one or more programs which when executed cause a processor to implement the steps of:
   selecting one or more candidate detections from said detection data collected by said sparsely deployed array of antennae for generation of one or more target tracks and for target classification;
   localizing and clustering the candidate detections to form a set of candidate target clusters in an observation plane;
   associating one or more candidate target clusters with one or more of existing target tracks and new frame-to-frame moving object tracks within a field of view;
   selecting a subset of image target track points along a given track for imaging;
   conditioning the detection data for a selected image track point using one or more conditioning filters to generate an image-data-set; and
   identifying a target imaging locus for each selected image track point and constructing a 3-D image using the image-data.

* * * * *